A. C. AUSTER.
WEATHER SCREEN FOR VEHICLES.
APPLICATION FILED JAN. 12, 1910.
998,320.
Patented July 18, 1911.
5 SHEETS—SHEET 4.
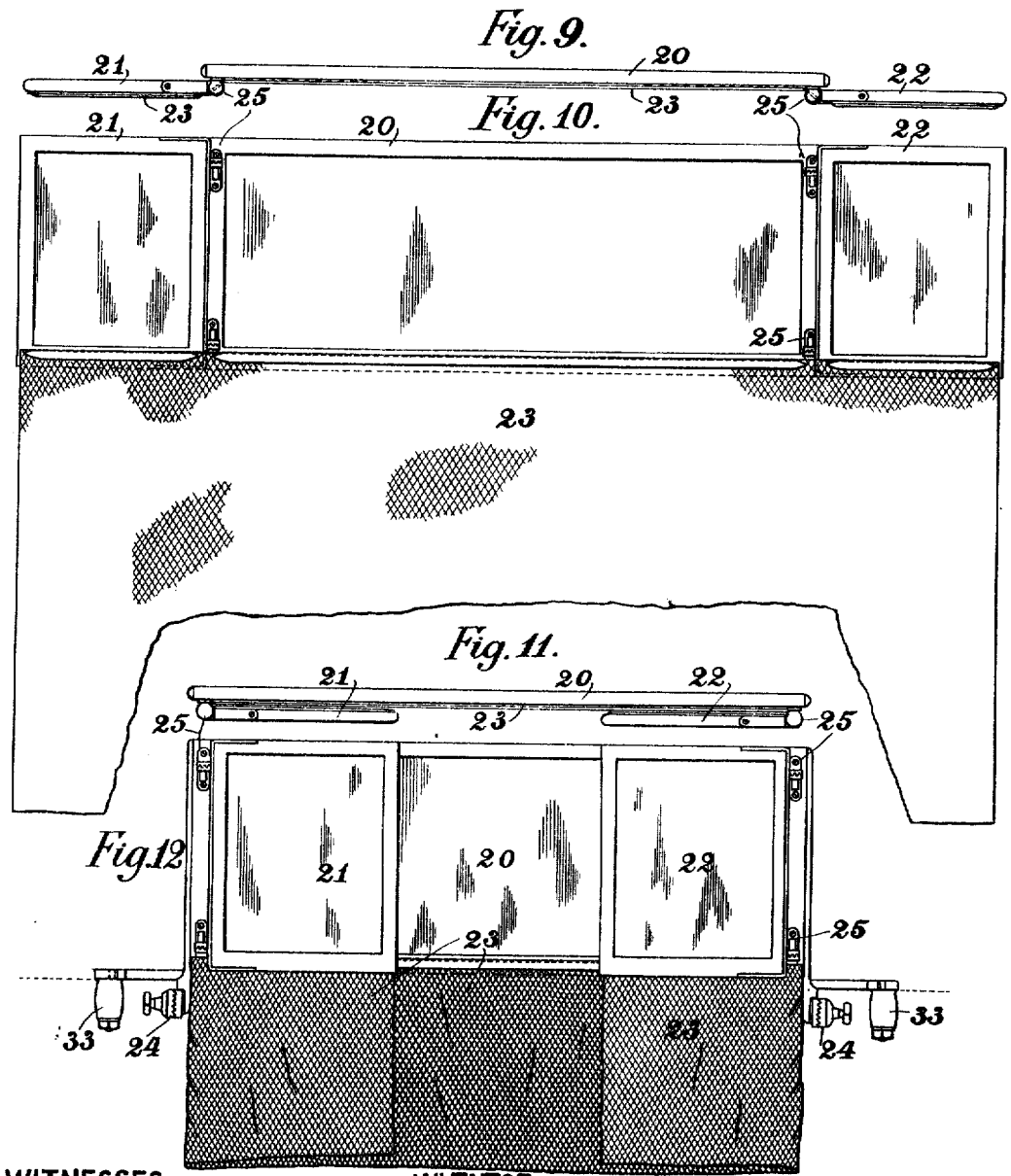

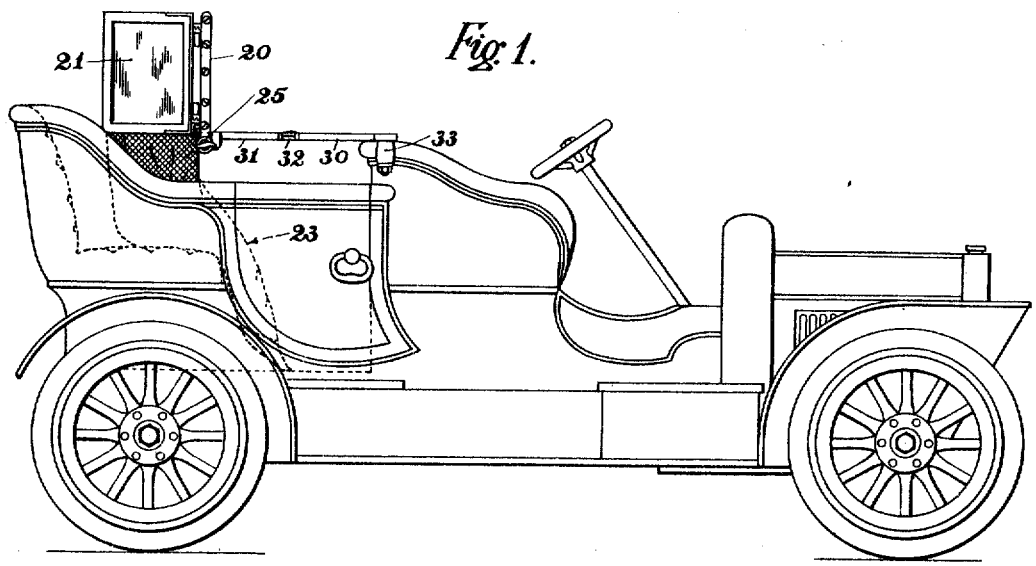
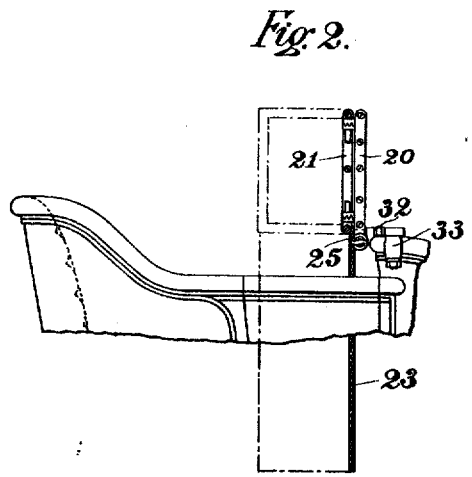
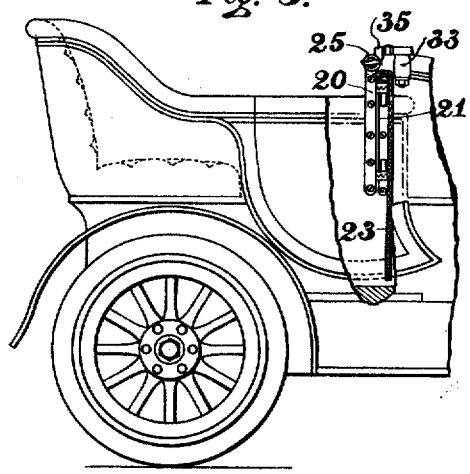

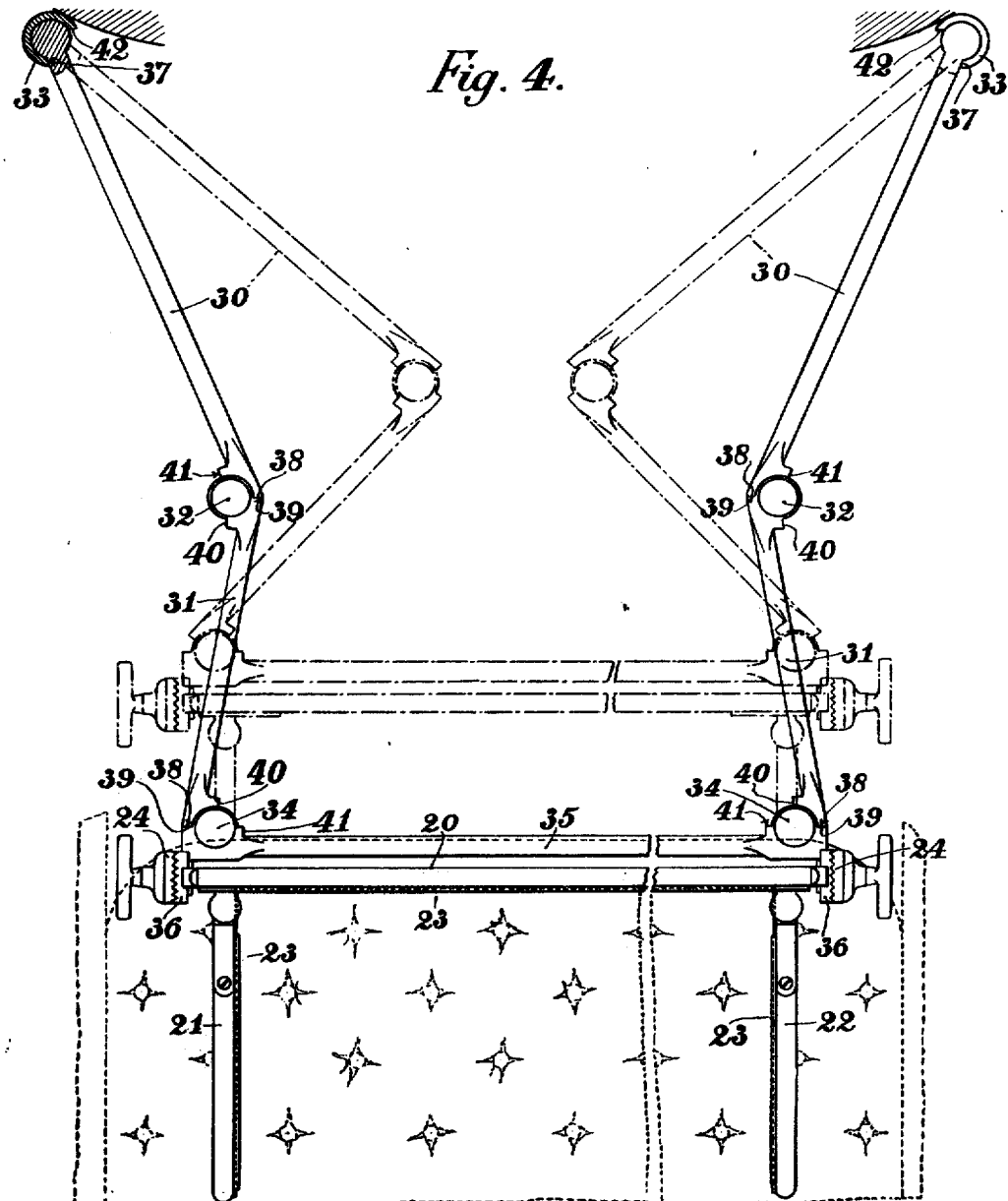

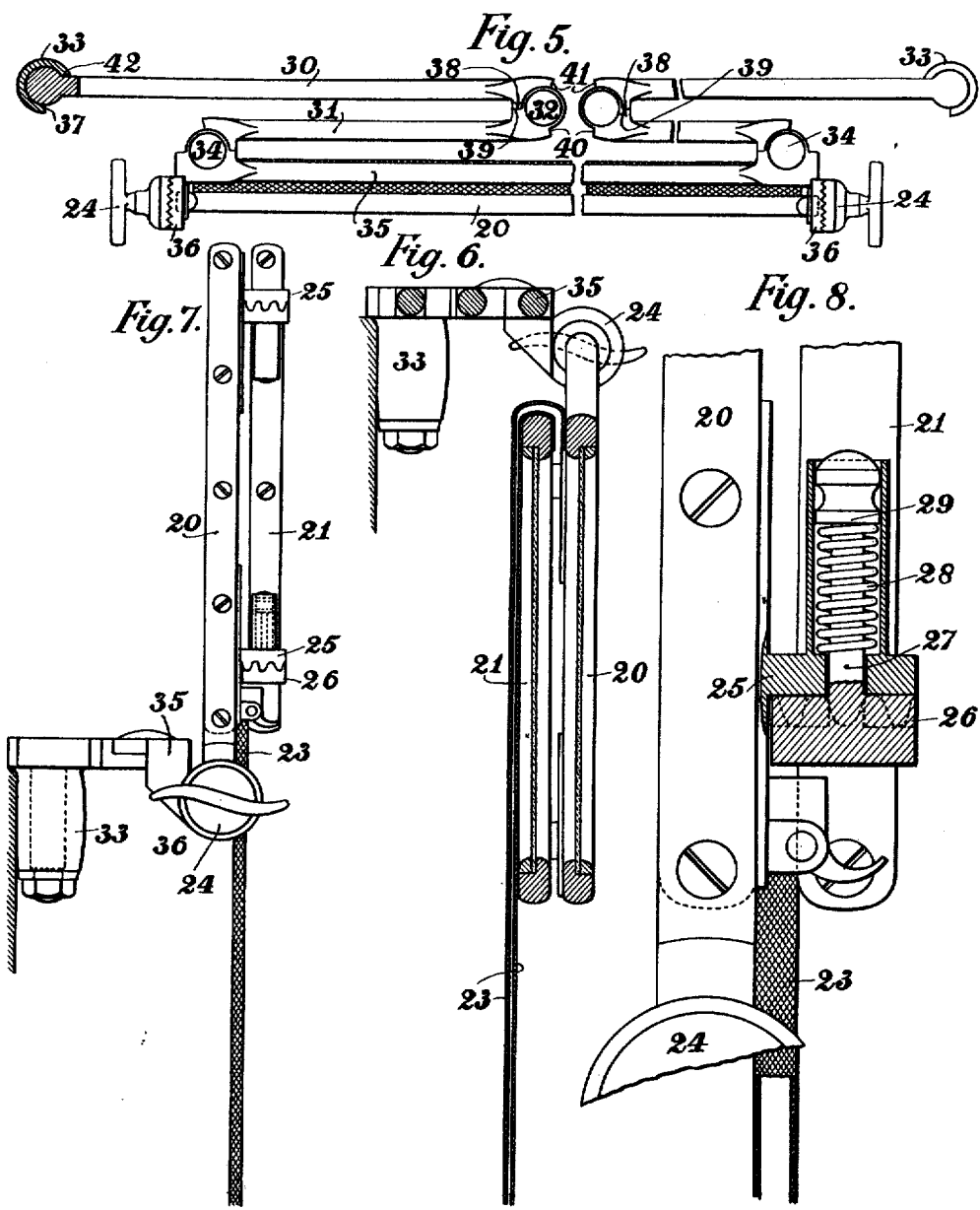

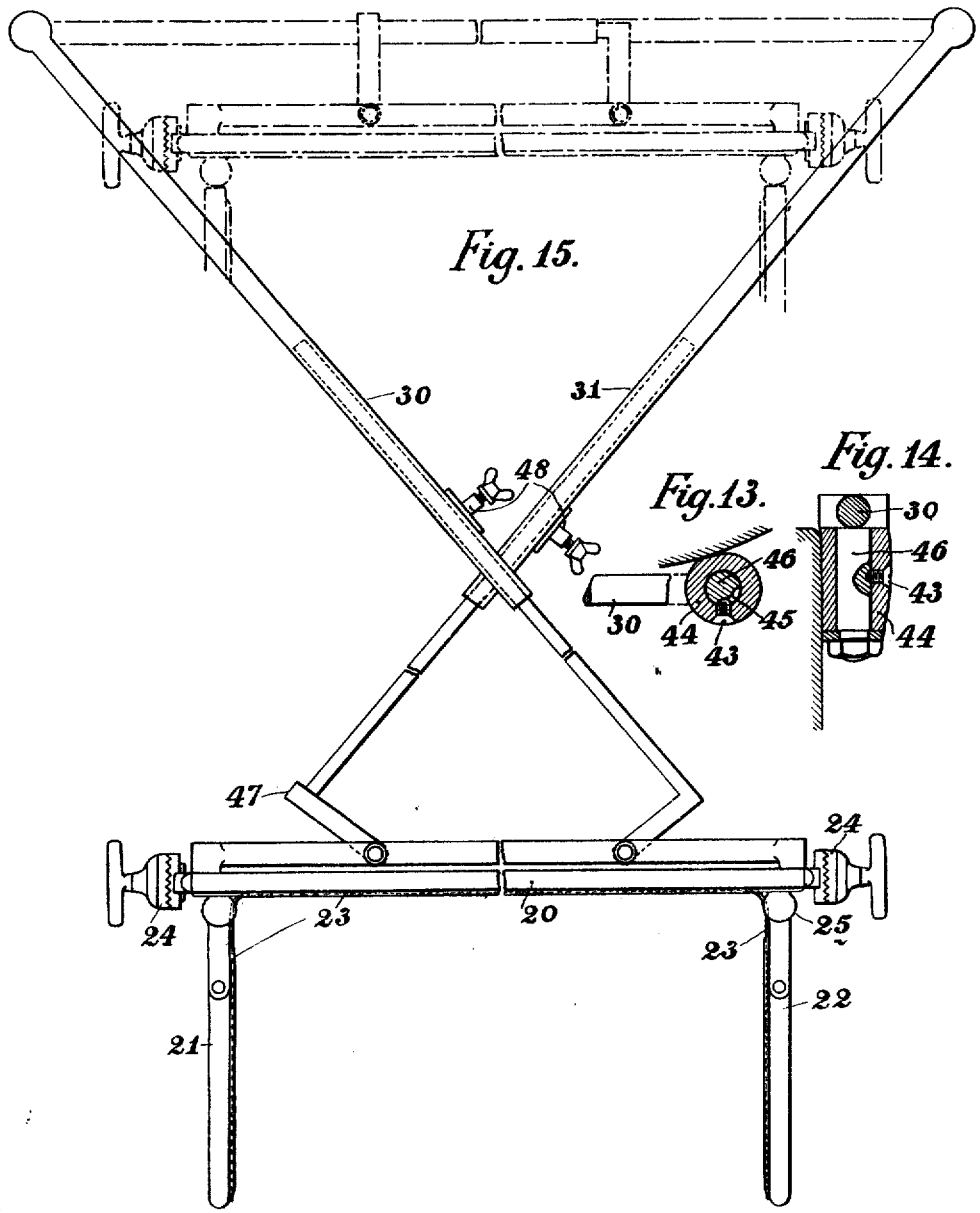

United States Patent Office notwithstanding—

UNITED STATES PATENT OFFICE.

ARTHUR COLLINS AUSTER, OF BIRMINGHAM, ENGLAND.

WEATHER-SCREEN FOR VEHICLES.

998,320.   Specification of Letters Patent.   Patented July 18, 1911.

Application filed January 12, 1910. Serial No. 537,667.

*To all whom it may concern:*

Be it known that I, ARTHUR COLLINS AUSTER, subject of the King of Great Britain, residing at Crown Works, Barford street, Birmingham, England, have invented certain new and useful Improvements in Weather-Screens for Vehicles, of which the following is a specification.

Hitherto no practical weather screen for open motor and other vehicles has been designed which combines adequate protection for the occupants (particularly the occupants of the rear seats of side entrance and tonneau bodies) with ease of adjustment and manipulation to give clear or free ingress and egress to and from the vehicle.

The object of the present invention is to provide a screen system which is adaptable to any type of side-entrance or like open body and whereby all the above-mentioned and other advantages can be attained, inasmuch as the said invention, as applied to a back-seat weather-guard, comprises not only a primary or main screen extending across the whole width of the vehicle body, but also a pair of adjustable and folding sidewings provided at the ends of the said primary screen, and a waterproof apron or knee-covering which is attached to, and hangs from, the lower edges of the primary screen and side wings so as to fill up all the space between the said screen elements and the floor of the vehicle while this weather-guard unit constituted by the said primary and side screens and apron is carried upon folding extensions supports or fittings which are adjustable or transplaceable bodily with the said guard or screen by a draw-and-push action or other simple movement and are so constructed and applied to the car, that, when the screen is not required, or when persons are entering or leaving the vehicle, the whole can be folded or stowed away into a minimum compass in a position where it leaves the entrance perfectly clear and unobstructed, whereas when the maximum protection is required, the whole screen, including the apron, can be set back or transplaced bodily into a position where it is close up to the protected seat and where the side wing and apron elements can be so arranged as to form a snug inclosure that effectually shields the occupants of the said seat from wind, rain, side drafts and other discomforts. And further, in the preferred form of the invention, the transplacement of the entire screen or weather-shield toward the rear seat of the vehicle, and also the movement in the reverse or forward direction, is effected without disturbing either the height or the parallelism of the same relative to the said seat, which renders it a very simple matter for the occupants of the rear part of a car to manipulate or adjust the same, even when seated.

Figure 1 of the accompanying drawings shows a weather screen system constructed in accordance with the invention and applied to a side-entrance open-bodied car for protecting the occupants of the rear seat. This view shows the parts adjusted to the positions in which the elements of the screen unit afford a maximum protection for the occupants of the rear part of the car. Fig. 2 is a similar view but with the extending supports collapsed and the side wings folded behind the primary or middle screen so as to provide for ingress or egress to or from the vehicle by way of the side entrance. Fig. 3 is a view showing how the screen unit can be folded down and stowed away behind the front or driving seat when not required for use. Fig. 4 represents, in plan and upon an enlarged scale, the screen unit and the extension mountings whereby the said unit is supported from the back of the driving seat of the car. In this view, the full lines show the supports extended to the limit of their rearward-movement and the side wings set at right angles to the primary screen, while the dotted lines show the said supports partially extended and the screen in an intermediate position between the front and rear seats. Fig. 5 is a plan, similar to Fig. 4, but with the supports fully folded and the screen unit stowed away as in Fig. 3. Fig. 6 is a vertical section of Fig. 5, showing the position assumed by the apron relative to the other elements of the screen when the latter is folded down or stowed away. Fig. 7 is an enlarged view of the screen and its supports with the parts in the same positions as in Fig. 2. Fig. 8 shows a part of the screen upon an enlarged scale and particularly represents, in section, the construction of one of the automatic lock-action joints whereby the folding side wings are connected to the primary screen. Figs. 9 and 10 show, in plan and elevation, how the sidewing elements can be used to extend the effective width of the screen. Figs. 11 and 12 show more clearly how the side-wings and the portions of the apron which hang therefrom can be folded flat behind the primary screen and the middle portion of the said apron (as in Figs. 2 and 7) prior to the whole of the upper part being folded over and stowed down in the position shown in Figs. 3 and 6. Figs. 13 and 14 are respectively detail horizontal and vertical sectional views illustrating a modified form of stationary pivot connection for the arms which carry the screen elements; and Fig. 15 is a plan view on an enlarged scale illustrating a modified construction of extension mounting for supporting the screen.

The same reference numerals indicate corresponding parts in the several figures of the drawings.

The screen or weather-guard shown in these drawings, comprises a glazed main or primary frame 20, a pair of glazed sidewings or extensions 21, 22, and a waterproof apron 23. The frame 20 is connected to its supports (hereafter fully described) by a pair of lock-action side joints 24 which are arranged at its lower corners and provide both for the adjustment of the glazed elements of the screen to any desired rearward inclination, and also for the folding down or stowing of the same into the position shown in Fig. 3.

The side wing frames 21, 22, are hinged to pairs of brackets 25, which are fitted to the sides of the main or primary screen and project horizontally therefrom in the rearward direction, so as to support the vertical joints of the said wings in planes which are parallel with but set away to an extent from the said main screen. This method of mounting admits of either or both of the wings being adjusted into the position shown in Figs. 9 and 10 for extending the screen laterally and increasing its effective width; or they may be set at a right angle to the main screen (see Figs. 1 and 4) where they afford the maximum protection against side or back drafts; or they may be adjusted to any other angle; and finally, when no extended or side protection is required, the said wings may be folded back against the main screen, as shown in Figs. 2, 7, 8, 11 and 12. When so folded, the wings, being themselves glazed or transparent, do not obstruct the view through the main screen, and further, they may be then stowed away bodily with the main screen when the latter is turned down upon the side joints 24 into the position shown in Figs. 3, 5 and 6.

The adjustable side wing connections may be made by any form of bracket which extends horizontally and can be applied to either the front or back or side edges of the main screen so as to admit of the complete folding action. To provide for rigidly locking the wings in any desired relationship to the main screen, automatic lock action joint fittings such as shown in Fig. 8 may be employed. In this arrangement, the ears 26 on the edges of the wings carry vertical hinge-pins 27, which pass through holes in the brackets 25, and extend some distance above the latter. The said pins are surrounded by springs 28 having abutment at their lower ends against the brackets 25, and at their upper ends against shoulders 29 on the hinge pins, while the opposed faces of the ears 26 and brackets 25 are provided with teeth or serrations which are normally held in engagement under the effort of the springs and thus retain the side wings in any position in which they may be placed relative to the middle screen, although on sufficient force being applied to the wings the teeth on the joint ears can be made to ride under the teeth of the brackets and thus admit of the adjustment of the wings to a new position, and during such movement, the springs are compressed and rendered active for fully reëngaging the toothed surfaces and automatically securing the wings as soon as the adjustment is completed. It is, however, to be understood that any other arrangement, having either an automatic or positively-obtained action, may be used for securing or fixing the wings in relation to the middle screen.

The apron element 23 of the transplaceable screen unit is of a length equal to the combined widths of the middle screen and side wings and it is attached, at its upper edge, to the said wings and middle screen so that it extends continuously, or without any break or opening, from one end to the other of the glazed parts of the screen (see Figs. 9 and 10, etc.,) and as the said apron hangs down to and sags upon the floor of the car so that it completely fills up the space between said floor and the glazed screen elements, it will be appreciated that the said apron not only affords a weather-and-water proof covering for the knees and feet of the occupants of the car, but also serves most effectively to prevent wind, rain or drafts from driving under the glazed screens and therefore, especially when the whole screen is adjusted close up to the seat and the wings are fixed in the position shown in Fig. 1, the apron is a most valuable adjunct, since it coöperates with the other elements to inclose the three sides of the seat and afford a maximum of weather protection and comfort for the occupants. Indeed, the protection and comfort which the screen system provides is practically equal to that which obtains in a limousine or similar closed car-body. And, as already stated, the flexibility of the apron admits of its side parts folding or adjusting bodily with the wing screens from which the said apron sides are suspended. Figs. 9 and 10 show the apron in its maximum lateral extension, while Figs. 7, 11 and 12 show the side portions completely folded over onto the middle portion of the said apron. And if, when the parts of the screen are in this position, the lock-action side joints 24 are slackened or disengaged, the middle and side screens can turn over bodily and be folded down below the top of the car, and behind the apron which then assumes the position shown in Figs. 3 and 6.

As regards the mounting of a screen unit such as described, upon the body of a car; this is effected (according to the arrangement shown in Figs. 1 to 7) by means of a pair of adjustable and folding arms which are disposed between the rear of the driving seat and the middle element of the screen unit and are arranged to extend and collapse in a horizontal plane and so that whether the supports are folded or extended, the screen unit is always supported at the same height, and parallel to or square with the protected seat, and furthermore, the adjustments of the supports bodily with the screen may be made by a simple draw or push movement, or in such a manner that all operations incidental to the raising, extending, collapsing and folding of the screen system can be performed by a person occupying the protected seat and who can, therefore, readily draw the screen toward him, adjust its side wings and apron to afford whatever protection may be required, and again push it away from him to make a way for leaving the car. Thus, each folding arm consists of two links or members 30, 31, jointed to one another at 32, while the forward end of the one member 30 is anchored or connected to the body of the car, preferably by brackets 33, as shown, which are fixed on the opposite sides of the front or driving seat, whereas the rearward end of the other member 31 is hinged at 34 to the extremity of a rigid bar or transverse member 35 to which the screen unit is attached. In the particular construction shown, this transverse member carries the stationary tooth-faced cheeks 36 of the lock-action side joints 24, which provide for the hinging and folding of the screen relative to the supporting system constituted by the folding links 30, 31, and the rigid transverse member 35.

The whole of the anchoring connections and joints are arranged so that the members of the jointed arms will not sag or drop, and can make their folding and extension movements only in the horizontal plane in which the said links and their side brackets 33 are contained, and therefore it follows that the screen is always supported at the same height in relation to the vehicle body, whether when its supports are fully extended or fully collapsed, or when at any intermediate position between the maximum and minimum extension.

The side brackets 33 on driving seat are furnished with stops 37 which limit the outward angular movement of the links 30, while the knuckles of the middle joints 32 and also of the joints 34 between the links 31 and the transverse member 35, are also provided with pairs of stops or butts 38, 39 and 40, 41. The several pairs of stops 38, 39 coöperate with the side-bracket stops 37 to limit the rearward or extending movement of the arms and to render it impossible for the supports to sway laterally when fully extended, (see Fig. 4) whereby the parallelism of the screen relative to the protected seat is insured, whereas, in a similar manner, the pairs of stops 40, 41 coöperate with one another and with inside stops 42 on the brackets 33 to insure the parallelism of the screen when the supports are fully collapsed, as shown in Fig. 5.

The whole of the joints have a sufficiently stiff movement to insure that the supports shall remain in any position (either completely or partially extended or folded) in which they may be placed, but if positive rigidity is required, then certain of the joints may be of the lock-action type.

Instead of jointing the supporting extension arms to combined side brackets and stops such as shown in Figs. 4 and 5, a modification such as shown in Figs. 13 and 14 may be used, wherein a stop-pin 43 screwed through the side of the socket part 44 of the bracket is engaged with a groove 45 that extends for a distance in the circumferential direction around the vertical pivot-end 46 of the supporting arm 30.

As a modification, instead of mounting the transplaceable screen upon arms which are jointed to fold as described the same adjustment in the horizontal plane can be obtained by an arrangement of arms or supports which cross one another and may be extended and collapsed by a draw and push movement. One such modified or alternative arrangement is represented in Fig. 15, where two crossing arms 30, 31, are of a telescopic construction and are jointed at their forward ends to brackets on the sides of the front seat portion of the car body, while their rearward ends are jointed to a rigid transverse bar or member—to which the screen is attached by lock-action side joints or the like. The crossing arms are arranged one above the other, and the undermost one has a cranked connection 47 which is shaped to permit close folding of the said arms into planes parallel, or approximately so, with the folded screen, whereas the joints and the telescopic construction of the arms provides for the extension and folding movements. The screen and its supports can be locked in any desired position by providing clamping fastenings 48 in connection with the telescoping elements of the arms. The arms 30, 31 are of a square section, or are flat on their opposed sides, so that they have a wide or extended bearing on one another which assists in keeping them firm or rigid when extending and collapsing.

It is to be understood that although the invention is described and shown in its application to screens for the protection of the rear seats of open vehicles, for which purpose it is primarily and particularly adapted, yet in some cases the improvements may be applied and used for the protection of the occupants of the front seats of open cars.

Having fully described my invention, what I desire to claim and secure by Letters Patent is:—

1. In a weather screen for association principally with the back seat of open vehicles, a transversely disposed screen element and a pair of folding horizontally extensible supporting arms therefor, each arm being self-sustaining in a horizontal plane and embodying sections which are mutually associated for relative movement, a connection between one of the sections of each arm and said screen element, the connection including a vertical pivot for the arms, a horizontal pivot for the screen element, and means for locking the latter at different positions on its horizontal pivot, and a vertical pivot connection between the other section of each arm and a stationary support.

2. In a weather screen for association principally with the back seat of open vehicles, a transversely disposed screen element and a pair of folding horizontally extensible supporting arms therefor, each arm being self-sustaining in a horizontal plane and embodying sections which are mutually associated for relative movement, a vertical pivot connection between one of the sections of each arm and said screen element, a vertical pivot connection between the other section of each arm and a stationary support, vertical pivot connections carried by the said screen element and located in a plane parallel to and in the rear of the plane of said element, and side screen elements supported by the last named vertical pivot connections.

3. In a weather screen for association principally with the back seat of open vehicles, a transversely disposed screen element and a pair of folding horizontally extensible supporting arms therefor, each arm being self-sustaining in a horizontal plane and embodying sections which are mutually associated for relative movement, a vertical pivot connection between one of the sections of each arm and said screen element, a vertical pivot connection between the other section of each arm and a stationary support, side screen elements carried by and adapted to project rearwardly from or to be folded against the screen element first named, and a continuous flexible apron connected to the lower edges of said several screen elements and extending downwardly therefrom.

In testimony whereof I have hereunto set my hand in presence of two subscribing witnesses.

ARTHUR COLLINS AUSTER.

Witnesses:
HENRY SKERRETT,
HENRY NORTON SKERRETT.

---

Copies of this patent may be obtained for five cents each, by addressing the "Commissioner of Patents, Washington, D. C."